Aug. 4, 1959

A. NERGAARD

2,897,968

VALVE FOR WATER-SOFTENERS

Filed Dec. 13, 1952

Inventor
Arnold Nergaard
by W. Bartlett Jones,
Attorney

Aug. 4, 1959

A. NERGAARD

2,897,968

VALVE FOR WATER-SOFTENERS

Filed Dec. 13, 1952

Inventor
Arnold Nergaard
by W. Bartlett Jones,
Attorney

Aug. 4, 1959  A. NERGAARD  2,897,968
VALVE FOR WATER-SOFTENERS
Filed Dec. 13, 1952  5 Sheets-Sheet 5

Inventor
Arnold Nergaard
by W. Bartlett Jones,
Attorney

United States Patent Office 2,897,968
Patented Aug. 4, 1959

2,897,968

VALVE FOR WATER-SOFTENERS

Arnold Nergaard, St. Charles, Ill., assignor to Clayton Mark & Company, Evanston, Ill., a corporation of Delaware Application December 13, 1952, Serial No. 325,792

22 Claims. (Cl. 210—278)

The present invention relates generally to water-softening by the regenerative base-exchange process, and in particular to a novel valve construction which facilitates the regeneration of the base-exchange material and which permits the use of water in the normal way during the regenerative action.

In the base-exchange process there is a bed of solid material, such as the mineral zeolite, or synthetic minerals of like action, or certain synthetic resin-mineral materials, through which the hard water passes. The bed material exchanges cations of its composition for those cations of the hardness elements dissolved in the water. The conventional base-exchange materials have exchangeable sodium ions as components of their chemical composition. The common cations which make water hard or undesirable for domestic use, are calcium, magnesium, ferrous irons and ferric iron. The bed material assimilates these cations from the water and yields its sodium ions to the water.

The process is reversible by shifting the greater concentration of cations to the other side. A new bed has a limited capacity for softening water, so that in time it becomes exhausted in sodium ions for delivery to the water. If the water passing through the bed is made to carry a heavy concentration of sodium ions, the bed will assimilate sodium ions and yield to the water those calcium, magnesium and iron cations which it has previously assimilated. As a result, an exhausted or weakened bed is regenerated by subjecting it to contact with a sodium chloride brine, and then rinsing from the bed the residual brine containing any chlorides of calcium, magnesium or iron formed in the regeneration.

Many homes throughout the country are equipped with water-softening tanks, and regenerating equipment, the operation of which appears to some people as a major engineering task. Service companies exist which periodically attend to the regeneration for a fee, which may be saved by the occupant by use of the present invention.

It is an object of the present invention to provide apparatus controlling the various flows of liquid for regeneration, which is simple to operate, which may be simply operated manually by timing or be automatically timed and operated, and which permits the normal use of water from the system during regeneration.

It is a particular object of the invention to provide a master valve unit through which all connections are made in proper sequence during one revolution of a single valve operating cam shaft.

It is a particular object of the invention to provide a valve which automatically feeds brine into the system from a supply.

It is a further object of the invention to maintain a brine-forming tank in which brine is made automatically from salt and water in amount equal to that automatically taken from the supply.

It is also an object to provide such a valve of novel construction to facilitate both its normal operation, its adjustments for different systems, and its maintenance.

Various other and ancillary objects and advantages of the invention will appear from the following description and explanation of the invention, in connection with the accompanying drawings of a presently preferred embodiment thereof, in which.

In the drawings there is a representative water-softening system equipped with a multiple valve structure which includes a single cam shaft for operating a plurality of valve elements, illustrated as extending horizontally, and arranged for a sequence of operations or positions, by one revolution of the shaft. As illustrated, the valve is designed for four functional positions. The valve is so constructed that the cam shaft may turn slowly at a uniform rate for one revolution, to carry the valve through its four functions, as for example by connecting it to an electric motor arranged to be started manually and to stop automatically at the end of one revolution of the shaft. Also the valve is constructed so that by manual operation the shaft may be turned at predetermined time intervals from one functioning position to another.

There is provided for simplicity a pointer-handle for the cam shaft, and a valve structure such that the pointer has successive functional positions corresponding to the hour hand of a clock, namely, 12, 3, 6 and 9 o'clock. In the following description the valve positions are so referred to.

Figures 1, 2, 3, 4:
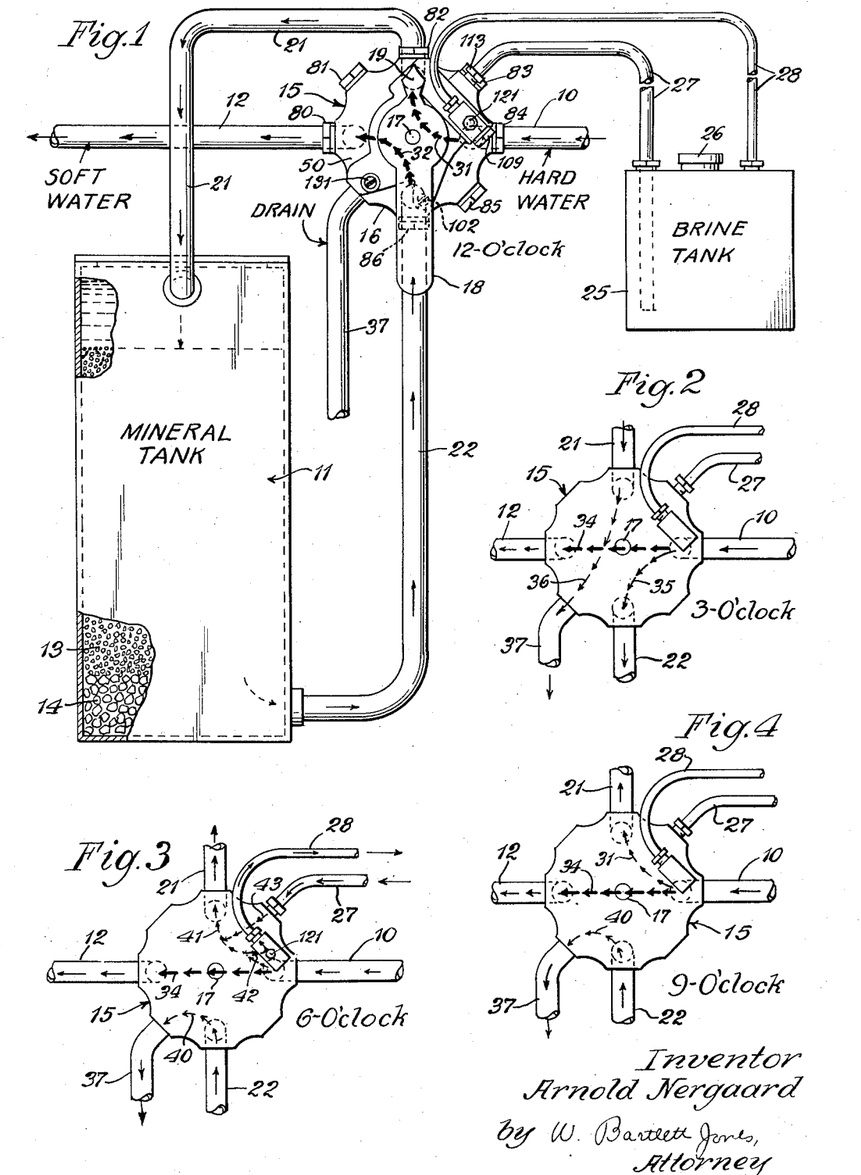
Fig. 1 is a general assembly view of the valve as connected to the softening tank, the brine tank, the water supply and the consumption line, including a diagrammatic representation of the functioning channels in the valve during the normal softening operation.
Fig. 2 is a schematic view of the valve similar to that in Fig. 1 showing the channels through the valve in the position thereof for back-wash.
Fig. 3 is a view similar to Fig. 2 showing the channels through the valve during the regeneration by brining.
Fig. 4 is a view similar to Fig. 2 showing the channels through the valve during the rinsing operation, just prior to return of the valve to its setting of Fig. 1.

Fig. 1 shows a main supply 10 of hard water, a water-softening tank 11, and a soft-water consumption line 12, for water from supply 10 after it has passed through a bed 13 of zeolite placed above a retaining bed of gravel 14. All connections are made through valve 15 of the present invention.

Valve 15 is shown for convenience as having a casing 16 of eight sides, a central horizontal cam shaft 17, and a valve handle 18, having pointer 19. Various pipe connections are indicated as made to the valve at several places. At the 3-o'clock valve side the hard water supply 10 is connected. In normal softening operation hard water leaves valve 15 at the 12-o'clock valve side via pipe 21 entering into the top of tank 11, wherein the water is softened. Soft water leaves tank 11 via pipe 22 entering valve 15 at its 6-o'clock side, and leaving valve 15 at its 9-o'clock side via said pipe 12.

For regeneration purposes there is a brine tank 25, shown as sealed by a removable cap 26 for supplying solid sodium chloride. The brine tank is designed to form and store a saturated solution of sodium chloride to be drawn out by valve action as required. Brine is formed by merely keeping salt and water in tank 25. As brine is drawn out via pipe 27 reaching to the bottom of tank 25 an equal supply of water is discharged into the top via pipe 28. Pipe 27 is connected to valve 15 at the 1:30-o'clock side. Pipe 28 is connected to the valve 15 at that face thereof which has the valve stem 17.

The structure and operation of the valve will best be understood by first giving an explanation of what the valve is designed to accomplish.

*Softening at 12-o'clock position.*—With the valve pointer 19 at 12-o'clock as in Fig. 1, the valve 15 establishes through it a channel 31 from supply pipe 10 to tank feed pipe 21, and a channel 32 from tank outlet pipe 22 to consumption pipe 12. This normal position is maintained until it is desired to, or time to, regenerate the bed 13. Then the valve stem 17 is turned into its next functioning range of positions, represented by its 3-o'clock position.

*Back-wash at 3-o'clock position.*—In Fig. 2 the valve pointer 18 has been moved to its 3-o'clock position to close channels 31 and 32 and to establish a reverse flow in the tank 11 as a flushing operation to carry back and discharge as waste any filtered impurities collected by the bed in normal operation; and also to provide water in the consumption line 12 by establishing a direct channel 34 from supply pipe 10 to consumption line 12. It also establishes a flushing channel 35 in the valve from supply pipe 10 to the tank bottom via pipe 22, thus to reverse flow from normal in tank 11. The valve 15 also establishes a channel 36 from the top of tank 11 via pipe 21 to a discharge drain pipe 37 connected to the valve casing 16 at its 7:30-o'clock side.

*Brining at 6-o'clock position.*—The valve stem is then moved into its next functioning range of positions represented by the 6-o'clock position for pointer 19, as in Fig. 3. The channel 34 established also at the 3-o'clock position is maintained, so that unsoftened water may be used during the regeneration. Channels 35 and 36 which were established at the 3-o'clock position are now closed and new channels are established, including a channel to draw in brine. Saturated brine is drawn in via pipe 27 and diluted by mixing with hard water from supply pipe 10, which also supplies brine tank 25 via pipe 28 with fresh water to create an equivalent amount of new brine. The new channels in the valve are: 40 from pipe 22 to pipe 37, 41 from supply 10 through a Venturi tube to pipe 21, 42 from channel supply 41 to feed hard water into the brine tank via pipe 28, and 43 from the brine pipe 27 into channel 41 at the Venturi tube and thence to top of tank via pipe 21. Thus, diluted brine flows via pipe 21 into the top of tank 11, then out at the bottom via pipe 22, through the valve 15 and out therefrom into drain pipe 37. This flow continues for a timed interval needed for regeneration. When the regeneration is complete, the next step is to rinse the bed for removing the brine.

*Rinsing at 9-o'clock position.*—In Fig. 4 the valve pointer 19 is moved into the range of positions for rinsing, as represented by its 9-o'clock position. One change is to cut off the flow to and from the brine tank by closing channel 41. And the other change is to reopen channel 31, leaving the channels 34 and 40 open. Then the valve stem is turned to enter its range of positions for normal softening, represented by its 12-o'clock position in Fig. 1. This involves closing the by-pass channel 34 and the draining channel 40.

The valve for accomplishing the foregoing operations may assume various forms. For simplicity of construction and maintenance it has a cast casing in two parts, a single operating cam shaft on which are mounted a series of cams for a series of internal valves, having radially disposed valve members operated by the cams to open and close valve ports between separate chambers within the valve casing. The several chambers are connected to the various pipes already described and to each other by over-passes or channels. The two-part casing consists of the main open-faced casing 16 and cap or closure 50 therefor best viewed in Fig. 9. The interface between the two parts is designated 51, representing also a gasket if the parts are not otherwise sufficiently tight when united by bolts (not shown).

The casing parts 16 and 50 have chambers and channels variously cast and machined in the parts, many of them in one part opening at the interface 51 for interconnection with or closure by the other part.

By reason of the existence of the chambers there are internal partitions between chambers and these are formed generally as walls concentric with the cam shaft 17. To simplify the description the chambers, rather than their walls will be referred to. The casing 16 from its exterior is provided with radially directed access openings of moderately large size, which are threaded for removable screw plug closures. Through these access openings the said concentric walls are drilled to provide both valve ports between chambers and bearing holes for valve stems. Also, through the access openings valve members are inserted and mounted, in a manner to permit easy removal and replacement, and also in a manner to permit each valve member to be yieldingly moved by a cam on the main valve stem 17 to open and close its port. These and other structures will be hereinafter described in detail.

Figure 5:
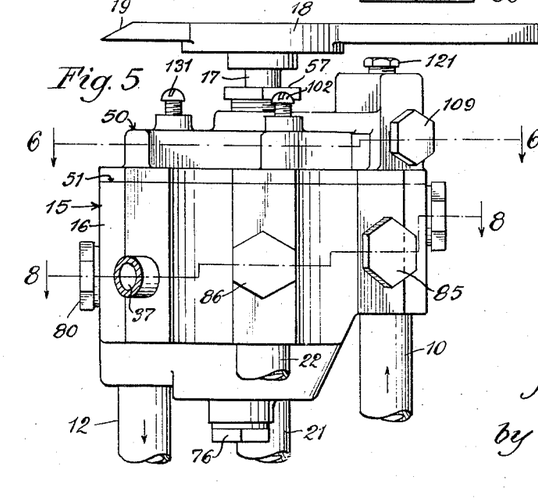
Fig. 5 is a view of the valve of Fig. 1 looking from the left, with its control face turned up to horizontal position for convenience.
Figure 7:
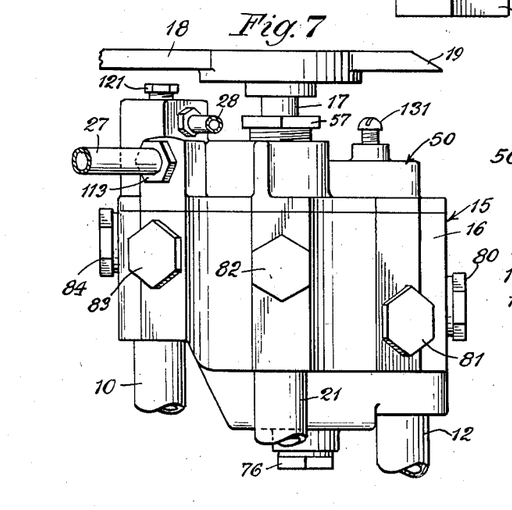
Fig. 7 is a view of the valve similar to that in Fig. 5 but taken from the opposite side.
Figures 9, 10, 11:
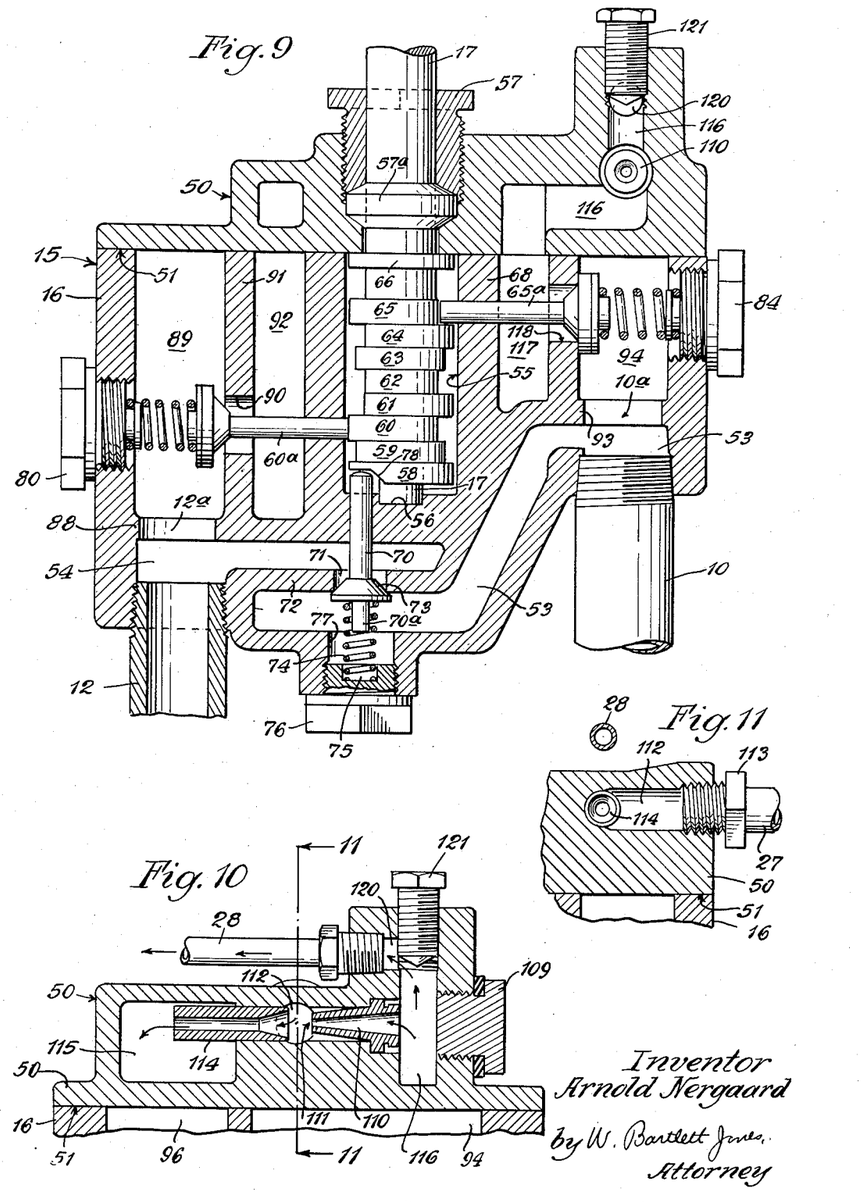
Fig. 9 is a cross-section through the axis of the valve taken on the line 9—9 of Fig. 6.
Fig. 10 is a cross-section of the casing cap taken on the line 10—10 of Fig. 6 showing the brine syphon.
Fig. 11 is a fragmentary cross-section through the brine syphon taken on the line 11—11 of Fig. 10, showing the brine delivery channel entering the Venturi tube of the syphon.

Fig. 5 represents a side view of the valve 15 in its 12-o'clock position of Fig. 1, showing pipes 10, 12, 21 and 22 entering the casing 16 at the rear (of Fig. 1) opposite the control handle 18, and thus parallel to the main stem 17, and showing drain pipe 37 tapped into the side of casing 16. Fig. 7 is a view of the other side of the valve showing in addition the pipes 27 and 28 respectively from and to the brine tank 25. Fig. 9 shows in more detail just how pipes 10 and 12 connect to casing 16, leading respectively into hard water chamber 53 and the normal soft-water chamber 54.

The two casing parts or castings 16 and 50 together provide a cam chamber 55, at the bottom of which (Fig. 9) main valve stem 17 bears in a recess bearing 56. A packing nut 57 for packing 57ᵃ in casing cap 50 closes the cam chamber against leakage outwardly. In Fig. 9 there is shown alined on and rigid with valve stem 17 a series of eight cams designated upwardly 58 to 65 inclusive, and above them a bearing flange 66 to bear on casing cover 50 at interface 51. The wall defining the said cam chamber 55 is designated 68, and at regions opposite the cams, except lowermost cam 58, there are seven radial bearing holes for seven radial valve stems showing in Fig. 8, of which the terminal ends appear also in Fig. 6; wherein the cams and valve stem are omitted.

Cam 58 in Fig. 9 functions to open and close a channel from hard water supply pipe 10 to consumption line 12, by moving valve stem 70 to open and close a port 71 in wall 72 between said chambers 53 and 54. Valve stem 70 carries a valve head 73 seating over port 71 to close it. Stem 70 extends as a stub 70ᵃ through and beyond the head 73 to receive around it one end of a coiled compression spring 74 of which the other end seats in a recess 75 in a screw plug 76 closing access opening 77 in the casing 16. Cam 58 has a portion of its face beveled as shown at 78 to open port 71 by action on stem 70 against spring 74. Thus the channel 34 (open port 71) is established as in Figs. 2, 3 and 4 for all positions except that for normal softening.

The descriptions of plug 76 for closing its access opening 77 into the casing 16, of the spring 74, and of the valve member 70—74—70ᵃ just within the access port, are sufficient for seven similar structures around the casing 16, for which the locations are indicated by numerals 80 through 86 on the closure plugs, for valves 60ᵃ, 59ᵃ, 63ᵃ, 64ᵃ, 65ᵃ, 62ᵃ and 61ᵃ, in clockwise direction.

In Fig. 9 just over pipe 12 and across said hard water chamber 54, there is a circular port 12ᵃ in wall 88 connecting chamber 54 with a chamber 89 in which there is opposite plug location 80 a valve member (including head and stem) 60ᵃ for cam 60, to open and close port 90 in wall 91 between chambers 89 and 92. Port 90 corresponds to channel 32 in Fig. 1.

Figure 8:
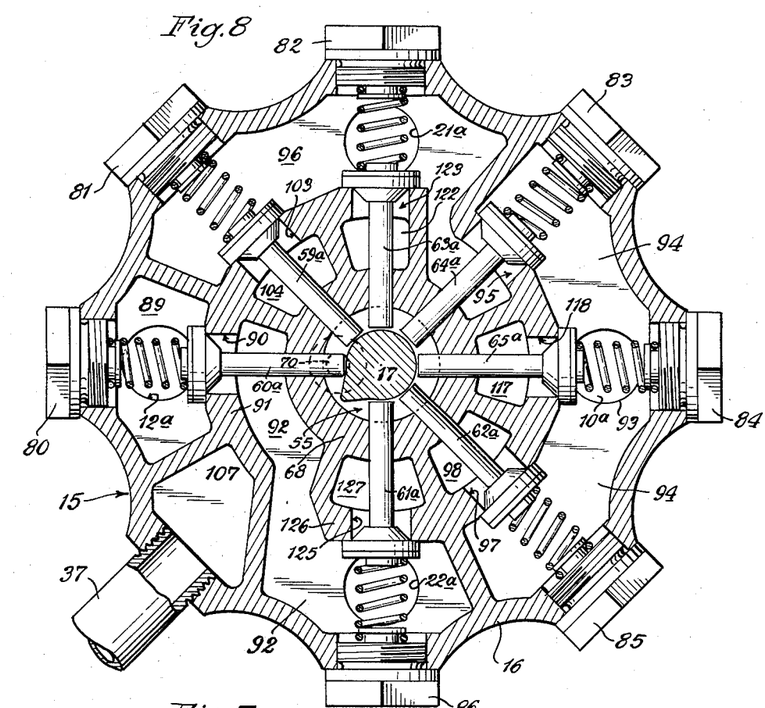
Fig. 8 is a cross-section taken through the main valve casing on the line 8—8 of Fig. 5.

In Fig. 9 hard water entering via pipe 10 passes upwardly in casing 16 through a port 10ᵃ in a wall 93 to a curving chamber 94 (as seen in Fig. 8). Chamber 94 is open at interface 51 and closed off by cover 50. For chamber 94 there are three valves 62ᵃ, 64ᵃ and 65ᵃ. Valve 64ᵃ controls port 95 entering chamber 96, in the bottom of which is a port 21ᵃ over the pipe 21 which leads to the top of tank 11. Accordingly, port 95 corresponding to channel 31 in Fig. 1 is normally open when port 90 is open for delivering softened water.

Figure 13:
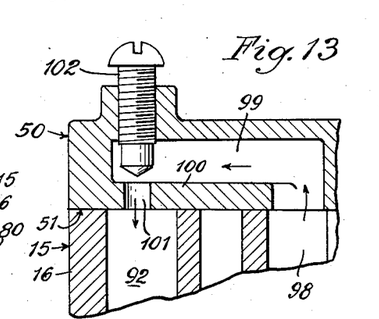
Fig. 13 is a fragmentary cross-section on the line 13—13 of Fig. 6 showing a screw adjusted orifice between a channel in the casing cap and a chamber in the main casing for the control of flow during back-washing.

When the 3-o'clock position of Fig. 2 functions, the ports 90 and 95 at locations 80 and 83 are closed by the cams 60 and 64 and the port 71 at the rear of the valve 15 is opened by the end cam 58. For the channel 35 from supply pipe 10 to pipe 22, the valve 62ᵃ at plug location 85 is operative to open port 97 between hard water chamber 94 and a chamber 98. Chamber 98 opens upwardly to interface 51 where it communicates with a channel 99 (see Fig. 13) in the casing cap 50. Channel 99 overlies a wall 100, which serves to cap and close underlying chamber 92 which leads to pipe 22ᵃ (see plug location 86 in Fig. 8). In wall 100 there is a control port 101 connecting chambers 99 and 92, and threaded into the casing cover 51 over the port 101 is an adjusting screw 102 to control the flow through the port 101. Thus open port 97 at location 85 corresponds to channel 35 in Fig. 2.

But also channel 36 of Fig. 2 must be open to connect pipe 21 to the drain 37 for back wash. Valve 59ᵃ at plug location 81 opens port 103, thus connecting chamber 96 (see plug locations 81—82 at top of Fig. 8) with chamber 104 in casing 16. Chamber 104 is open at its top to interface 51 and there communicates with one end of an over-pass or channel 105 in the casing top 50 (see Figs. 6 and 9). Channel 105 at its other end designated 106 in Fig. 6 communicates across interface 51 with chamber 107 (at 7:30 o'clock in Fig. 8) into which drain pipe 37 is tapped. Thus open port 103 corresponds to channel 36 in Fig. 2.

Figure 6:
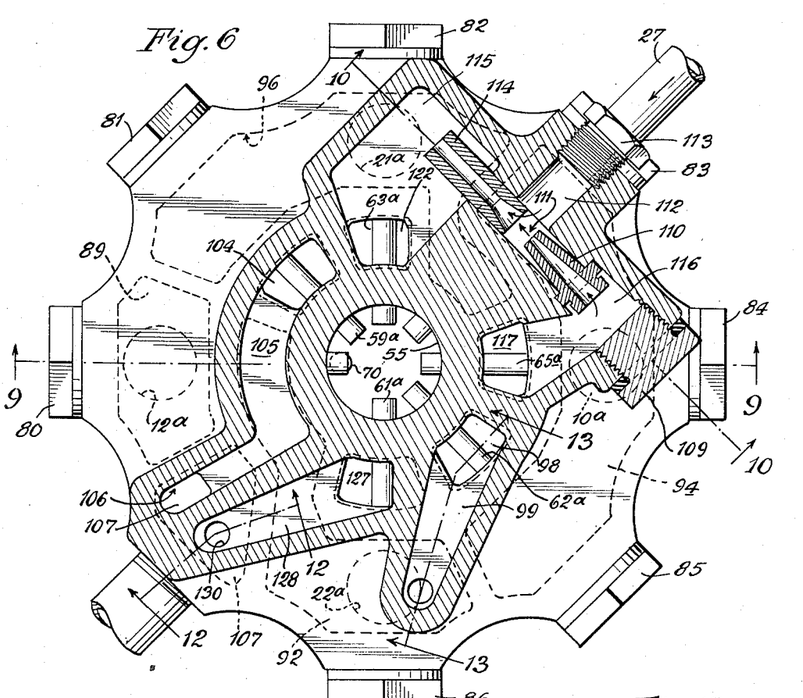
Fig. 6 is a cross-section of the valve taken on line 6—6 of Fig. 5, with the cam shaft and its cams removed.

For the 6-o'clock position of Fig. 3, the brine must be introduced. This is accomplished by a syphoning action or Venturi tube through which a flow of hard water draws brine and dilutes it. Provision is made to return as much fresh water to the brine tank. The Venturi tube is in the channel 41 of Fig. 3. In the casing cap 50 there is an access plug 109 (near location 84 in Fig. 6) for inserting a Venturi tube (see Figs. 6 and 10). The constricting tube 110 has its orifice 111 terminate at the junction with a brine channel 112 from supply pipe 27 entering the cap 50 above the plug location 83, through packing nut 113, thus to mix brine with water leaving orifice 111, to deliver the mixture through nozzle 114 into a chamber 115 in the cap 50. Hard water reaches the Venturi tube from chamber 116 in the cap 50 (see Figs. 10 and 6). Fig. 6 shows the chamber 116 in casing cap 50 extending to a position over and communicating with a chamber 117 in casing 16 at location 84 (see Fig. 8). Port 118 connects chambers 116—117 and hard water chamber 94, under control of valve 65ᵃ by cam 65. Thus, port 118 opens up one end of the brine-forming and delivering channel 41 in Fig. 3.

To feed water to the brine tank 25 the chamber 116 (Fig. 10) is extended beyond the entrance to Venturi tube 110 to an exit opening 120 at which is connected the water infeed pipe 28 to brine tank 25. An adjusting screw 121 regulates the feed of water.

The chamber 115 (Fig. 10), receiving the diluted brine from the Venturi tube lies in the casing top 50, and communicates through interface 51 with chamber 122 in casing 16 at location 82 (see Fig. 8). Port 123, controlled by valve 63ᵃ and cam 63 at plug location 82 connects chamber 122 with chamber 96 which leads via pipe 21 to the top of tank. Accordingly port 123 opens to deliver brine, completing the channel 41 of Fig. 3. Said channel is thus opened at one end to form brine by open port 118 as described, and opened at its discharge end by open port 123.

Figure 12:
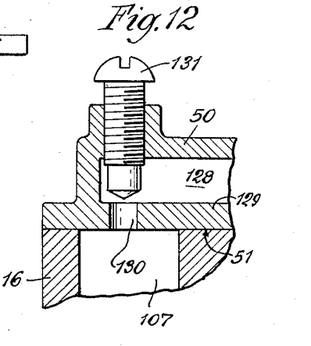
Fig. 12 is a fragmentary cross-section on line 12—12 of Fig. 6 showing the water pocket leading to the drain pipe, as it is connected to a channel in the casing cap by an adjustably controlled port.

The delivery of brine as described is accompanied by passing the brine through the tank, back through the valve 15 and out therefrom via discharge pipe 37, corresponding to the valve channel 40 in Fig. 3. This calls for the brine discharge to enter the valve 15 via pipe 22, which brings the brine into the valve at location 86 into chamber 92 (see Fig. 8). Port 125 in wall 126 connects chamber 92 with chamber 127 under control of valve member 61ᵃ by cam 61. Chamber 127 is open at interface 51 where it communicates with an over-pass channel 128 in casing cap 50 (see Figs. 6 and 12). In casing cap 50 a wall 129 separates channel 128 from chamber 107 (see 7:30 o'clock location in Figs. 6 and 8) into which drain pipe 37 is tapped. A small port 130 in wall 129 connects channel 128 and chamber 107, and an adjustable screw 131 in casing cap 50 controls the flow through port 130.

The following Table I is a summary of parts and actions, which enables one to follow the action by reference to the drawings.

TABLE I
Summary of parts and action

| Fig. | Action | Channel | At Location | open port | passes | from chamber | to chamber | for delivery to— |
|---|---|---|---|---|---|---|---|---|
| 1 | Softening | 31 | 83 | 95 | Hard Water | 53–94 | 96 | Top of tank 11. |
|   |           | 32 | 80 | 90 | Softened Water | 92 | 89 | Use pipe 12. |
|   |           | 34 | **76 | 71 | Hard Water | 53 | 54 | Use pipe 12. |
| 2 | Back-Wash | 35 | 85 | 97 | ___do___ | 53–94 | 98–99*–92 | Bottom of tank. |
|   |           | 36 | 81 | 103 | Back Washed Water from top of tank. | 96 | 104–105*–107 | Drain 37. |
|   |           | 34 | **76 | 71 | Hard Water | 53 | 54 | Use pipe 12. |
|   |           | 40 | 86 | 125 | Used Brine | 92 | 127–128*–107 | Drain 37. |
| 3 | Brining | 41 | 84 | 118 | Hard Water | 94 | 117–116*–thru Venturi*–115*–122. | Port 123. |
|   |           | 41 | 82 | 123 | Brine | 122 | 96 | Top of Tank 11. |
|   |           | 34 | **76 | 71 | Hard Water | 53 | 54 | Use pipe 12. |
| 4 | Rinsing | 31 | 83 | 95 | ___do___ | 53–94 | 96 | Top of Tank 11. |
|   |           | 40 | 86 | 125 | Waste Rinse | 92 | 127–128*–107 | Drain. |

*Overpass in cover cap 50.
**At rear of casing 16.

From Table I, from the vertical alinement in Fig. 9, and from the radial arrangement of Fig. 8, the following Table II is derived, giving under "cam" the downward (Fig. 9) vertical order of cams, giving under "location" the radial direction of valve action, and giving under Figs. 1 through 4 the identification of port which is open at the position of the given "figure."

Figures 14, 15:
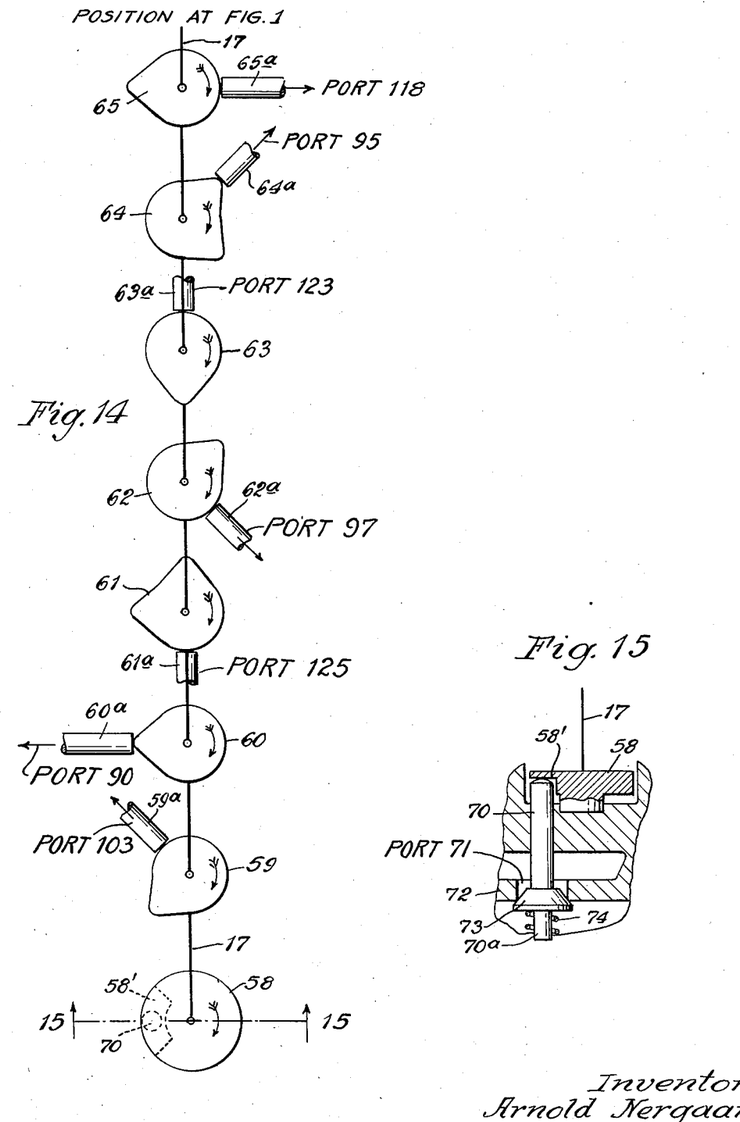
Fig. 14 is a semi-diagrammatic representation of the cam shaft and the cams carried thereby, giving their positional relation one to another and their actuating relation to the valve members as they are radially disposed and positioned for softening as in Fig. 1.
Fig. 15 is a cross-section of the end cam on the cam shaft as taken on the line 15—15 of Fig. 14 and as positioned in Fig. 9.

To simplify a description of the cams as related to their valve members, Fig. 14 is given diagrammatically. Valve stem 17 is represented by a vertical line. The cams thereon are shown turned to 90° to lie in the plane of the drawing, each in the position taken in Fig. 1 if viewed individually along the axis of stem 17. The valve members actuated by the cams are illustrated in the normal radial positions with respect to the centers of their cams, and they are identified by a legend naming the port opened by each.

Fig. 14 is read in connection with the following Table II.

TABLE II.—PORTS OPEN

| Cam | Location | Fig. 1 | Fig. 2 | Fig. 3 | Fig. 4 |
|---|---|---|---|---|---|
| 65 | 84 |     |     | 118 |     |
| 64 | 83 | 95  |     |     | 95  |
| 63 | 82 |     |     | 123 |     |
| 62 | 85 |     | 97  |     |     |
| 61 | 86 |     |     | 125 | 125 |
| 60 | 80 | 90  |     |     |     |
| 59 | 81 |     | 103 |     |     |
| 58 | ¹76 |    | 71  | 71  | 71  |

¹At rear of casing 16.

Fig. 15 represents cam 58 in its normal softening position on stem 17. As shown by Table II its controlled port 71 is open at all times except during normal softening. Hence, during the setting of Fig. 1, valve stem 70 is in raised position by reason of the quadrant 58' tapering to maximum cutaway depth, which effects closure of port 71.

Each valve-camming portion on the cams is so formed that each valve gradually opens in the last half of its quadrant turn to a new setting, and gradually closes in the first half of the next quadrant turn to a new position. There is no sudden action of opening or closing. By reason of this structure there are no water hammers in manual operation from one position to another. A second advantage is the ability to connect the valve to a slowly turning motor-operated member, so that a uniform timed rate of turning carries the valve through all the connections as described.

The invention is not limited to the preferred form and use thereof as described above. Although it is desirable to form brine automatically from solid salt, as make-up for that withdrawn, the valve as shown may be adjusted to cut off the water supply in conduit 28 to the brine tank by positioning the control screw 121 (Fig. 9) to cut off the opening 120 which leads to conduit 28. When so doing, one need only maintain in the brine tank 25, which may be larger than shown, an adequate supply of brine, preferably as a saturated solution containing undissolved salt. Water and salt may be added as needed, the water not necessarily passing through the valve unit 15 and conduit 28, unless one desires to open adjusting screw 121 during the brining position (Fig. 3) of the valve unit 15. This may be done so as to supply more water to tank 25 via conduit 28 than there is brine syphoned off via conduit 27. With or without the use of conduit 28, the Venturi syphon may be adjusted to draw brine from tank 25 for dilution and use as described.

It is also to be understood that the valve unit may have other forms, and that the pockets need not be arranged in the relationship one to another as shown. By reason of the two part construction illustrated, the main casing 16 is cast with chambers or pockets therein opening at the interface 51. The cap section 50 fitting section 16 at said interface provides walls and channels variously serving to close in whole or in part one or more pockets in section 16 and also to interconnect pockets in section 16 by overpass channels. It will be appreciated that these functions of the cap section 50 may be divided into two modified caps for two interfaces (like interface 51) presented by a suitably modified main casing 16. The inner axial valve members and their operating cams may be variously positioned relative to the cam shaft 17, a radial position being used in seven instances and a different position being exemplified by the valve member 70 which by-passes hard water through the valve in all positions except normal water-softening position in Fig. 1.

From the foregoing it will be understood that the valve unit includes numerous novel features of construction, having new and useful functions, and that all these cooperate to provide a new and useful water-softening system, all within the scope of the appended claims.

I claim:

1. A valve unit for a water softening system comprising a valve casing having a plurality of water chambers therein, a single rotary cam shaft in said casing and, a plurality of internal axially movable spring-pressed valve members for opening and closing ports within the casing between said water chambers, a plurality of cams on said cam shaft arranged to actuate said internal valve members, said casing having a channel therein between two ports controlled by said internal valve members, a portion of said channel constituting a Venturi tube having a constricted orifice communicating with a brine delivering passageway, whereby flow of water in said channel draws brine into said channel and therein dilutes the brine.

2. A valve according to claim 1 having in addition a hard water conduit and in communication with the hard water entrance to said Venturi tube for supplying water to a brine tank in compensation for brine withdrawn therefrom while brine is being withdrawn.

3. A valve according to claim 2 wherein there is an adjusting member operable to control the flow of hard water in the said hard water conduit for the brine tank.

4. A valve for a water-softening system having a Venturi tube positioned in the valve for the flow of hard water therethrough for a regeneration step, said valve having a brine channel therein for delivery of brine to the constricted orifice of said Venturi tube, said valve having an opening for connecting a brine conduit to deliver brine to said brine channel, and said valve having an opening for connection of a hard water conduit to a brine tank, said opening communicating in the valve at all times with the entrance to said Venturi tube.

5. A valve according to claim 4 wherein there is an adjusting member operable to control the flow of hard water in the said hard water conduit for the brine tank.

6. A valve for a water-softening system having a Venturi tube positioned in the valve for the flow of hard water therethrough for a regeneration step, said valve having a brine channel therein for delivery of brine to the constricted orifice of said Venturi tube, said valve having an opening for connecting a brine conduit to deliver brine to said brine channel, said valve having a hard water chamber therein and a valved port connecting said chamber with a second water chamber communicating with the entrance to said Venturi tube, having a third chamber therein communicating with the exit end of said Venturi tube, having a fourth chamber communicating with an opening for a conduit connection to the valve and having a valved port communicating with said third chamber, internal valve members arranged to open and close said valved ports, a rotary cam shaft for said valve, and cams carried by said cam shaft for controlling the effective positions of said internal valve members.

7. A valve according to claim 6 having in addition a hard water conduit connected thereto and in communication with the hard water entrance to said Venturi tube, whereby water may be delivered to a brine tank in compensation for brine withdrawn therefrom.

8. A valve according to claim 7 wherein there is an adjusting member operable to control the flow of hard water in the said hard water conduit for the brine tank.

9. A valve having separate chambers therein communicating with openings for separate connections thereto of a first conduit and a second conduit, a by-pass valved port between said two chambers, a by-pass valve member movable to open and close said port, said valve having a third chamber communicating with an opening for a third conduit and a fourth chamber connected to an opening for a fourth conduit, each of said four chambers being one of four pairs of chambers within the valve, the chambers of each pair being separated by a valved port, four valve members movable to open and close said last mentioned four ports, a cam shaft chamber in said valve, a main rotary cam shaft for said valve and located in said shaft chamber, said valve members having portions extending into said shaft chamber, cams on said cam shaft arranged to engage valve portions to activate said valve members and positioned so that in one position of the cam shaft water flows through one of said third and fourth chambers to the third conduit and water flows through the other one of said third and fourth chambers and then out of the valve, and so that in all other positions of said cam shaft said first mentioned by-pass port is open.

10. In a valve for a water softening system a water channel therein having as a portion of its length a Venturi tube, a brine supply connection from a brine-opening in the valve to the suction region of said tube, a hard water supply connection for delivering hard water to the entrance of said tube, a hard water connection from said hard water supply to a hard water outlet opening in the valve, and means within the valve to establish concurrently a flow of hard water through said Venturi tube and a flow of hard water to said outlet, whereby to draw brine into said channel when said brine opening is connected to a brine tank and to deliver replacement hard water to said tank when said outlet opening is connected to said tank.

11. A multiple valve unit comprising a casing of at least two sections secured together at an interface at complementary walls, one section being a body section having within it a rotary cam shaft extending at right angles to said interface, said cam shaft being located in a cam-chamber in said body section, said body section having eight reference positional sections located in sequence about said shaft, each of said sections having a partitioned pair of chambers opening at said interface, each pair comprising an inner chamber and an outer chamber, a continuous wall defining said cam-shaft chamber and partitioning all of said inner chambers from said cam-shaft chamber, said outer chambers of the pairs being located adjacent the exterior wall of the body section, walls partitioning each inner chamber from its paired outer chamber, all of said pair-partitioning walls having ports therein between each pair of chambers except that wall in the fifth section, poppet valves arranged to open and close said ports of said paired chambers, said poppet valves having valve stems extending through said wall enclosing the cam-shaft chamber, cams on said cam shaft to open and close said poppet valves, the outer chambers at the first, second and third sections being in communication with an opening in the casing for connection of a first conduit, the outer chamber of the fourth section and the inner chambers of the fifth and sixth sections being in communication with an opening in the casing for a second conduit, the outer chamber in the fifth section being in communication with an opening in the casing for connection of a third conduit, the outer chamber of the sixth section being in communication with an opening in the casing for connection of a fourth conduit, and the outer chambers of the seventh and eighth sections and the inner chamber of the first section being in communication with an opening in the casing for connection of a fifth conduit; the remaining casing section at said interface being a cover section having its interfacial wall serving as closing walls of the outer chambers at the first, second, third, sixth, seventh and eighth sections and of the inner chambers of the first, fifth and sixth sections, said cover section having channels therein as overpasses connecting chambers of the pairs through openings in its interfacial wall, the first channel connecting the inner chamber of the third section with the outer chamber of the fourth section, the second channel connecting the inner chamber of the fourth section with the outer chamber of the fifth section, the third channel connecting the inner chamber of the seventh section with the outer chamber of the fifth section, and the fourth channel connecting the inner chamber of the second section with the inner chamber of the eighth section, the latter overpass channel containing as a portion at least of its length a Venturi tube portion of which the inlet end is in communication with the inner chamber of the second section and of which the constriction portion is in communication with an opening in the casing for connection of a sixth conduit, the cam shaft having four operative positions and the cams thereon being arranged in softening position No. 1 to open only the ports at the first and sixth sections, in backwashing position No. 2 to open only the ports at the third and seventh sections, in brining position No. 3 to open only the ports at the fourth, second and eighth sections, and in rinsing position No. 4 to open only the ports in the first and fourth sections.

12. The valve unit of claim 11 in which the body section of the casing has a partition separating an extension of the outer chambers of the first, second and third sections and an adjacent extension of the outer chamber of the sixth section, said partition having a port between said chamber extensions, a poppet valve for opening and closing said last-mentioned port, said valve having its stem projecting into the cam shaft chamber, and a cam on said cam shaft for operating said last-mentioned poppet valve, and in which said last-mentioned cam functions to close its related valve only in position No. 1 and to open it in the remaining positions to by-pass hard water directly to the consumption conduit.

13. The valve unit of claim 11 in which the entrance end of the Venturi tube is in communication with an opening in the casing for a conduit to feed hard water therethrough.

14. The valve unit of claim 13 in which there is provided adjusting means for controlling the flow of said hard water.

15. The valve unit of claim 11 in which the first overpass channel is associated with adjusting means to control the flow therethrough.

16. The valve unit of claim 11 in which the second overpass channel is associated with adjusting means to control the flow therethrough.

17. A valve for a water softening system comprising a structure defining a channel, a portion of said channel constituting Venturi tube brine injection means, a pair of ports at inlet and outlet ends of said channel, movable valve means closing both of said ports, and movable control means for operating both of said valve means to open said ports for injecting brine into the softening system.

18. A valve for a water softening system comprising a plurality of sections secured together to provide a valve casing, a first section having a pair of chambers therein which are open at one end, and means including a second section for closing said chambers, said second section communicating with the first section and having a channel therein for interconnecting said chambers, said second section having a Venturi tube brine injection means located in said channel, said first section being provided with at least one port interconnecting said pair of chambers and at least one valve member for opening and closing at least one port for injecting brine into the softening system.

19. A valve comprising a plurality of sections secured together to provide a valve casing, a first section having two pairs of chambers therein which are open at one end, and means including a second section for closing said chambers, said second section communicating with the first section and having first and second channels therein for respectively interconnecting said two pairs of chambers, said second section having a pair of flow adjustment means therein for regulating flow through certain of said channels, said first section being provided with a plurality of ports interconnecting said pairs of chambers and a plurality of valve members for opening and closing the ports so that flow is sequentially effected through said channels.

20. A valve comprising a plurality of sections secured together to provide a valve casing, a first section having a plurality of annularly arranged chambers and a central chamber therein which are open at one end and certain of which have centrally facing valve ports, movable valve means for said ports including portions extending into said central chamber, means including a second section for at least partially closing said chambers at said one end, and a cam shaft for operating said valve means disposed between and held in assembled relation by said casing sections.

21. A valve comprising a plurality of sections secured together to provide a valve casing, a first section having a plurality of annularly arranged chambers and a central chamber therein which are open at one end, certain of said chambers having centrally facing valve ports arranged sequentially in radially and axially spaced relation relative to the length of the chamber, movable valve means for said ports including portions extending into said central chamber, means including a second section for at least partially closing said chambers at said one end, and a cam shaft for operating said valve means located in said central chamber.

22. In a valve for a water softening system, a water channel having venturi tube brine injection means therein, a brine supply connection leading from a brine opening in the valve to the suction region of said injection means, a brine tank water replacement passageway in the valve, means including a normally closed valved hard water port for delivering hard water to the entrance of said brine injection means and to a brine tank water replacement passageway in the valve, a normally closed valved port at the outlet from said brine injection means, and means controlling said valved ports operable to open them thereby to create suction in said brine supply connection for withdrawal of brine and to deliver water to said brine tank replacement passageway.

References Cited in the file of this patent

UNITED STATES PATENTS

| | | |
|---|---|---|
| 1,751,061 | Ter Beest | Mar. 18, 1930 |
| 1,929,405 | Bilde | Oct. 10, 1933 |
| 1,933,369 | Dotterweich | Oct. 31, 1933 |
| 2,012,194 | Hughes | Aug. 20, 1935 |
| 2,137,406 | Johnson | Nov. 22, 1938 |
| 2,254,421 | Eickmeyer | Sept. 2, 1941 |
| 2,277,573 | Wichorek | Mar. 24, 1942 |
| 2,388,268 | Kromhout | Nov. 6, 1945 |
| 2,435,366 | Riche | Feb. 3, 1948 |
| 2,460,011 | Hungerford et al. | Jan. 25, 1949 |
| 2,506,711 | Evans | May 9, 1950 |
| 2,610,945 | Purcell et al. | Sept. 16, 1952 |
| 2,662,549 | Rhinehart et al. | Dec. 15, 1953 |